United States Patent
Gulde

(10) Patent No.: US 12,211,237 B2
(45) Date of Patent: Jan. 28, 2025

(54) CORRELATION OF THERMAL SATELLITE IMAGE DATA FOR GENERATING THERMAL MAPS AT HIGH SPATIAL RESOLUTION

(71) Applicant: Fraunhofer-Gesellschaft zur Förderung der angewandten Forschung e.V., Munich (DE)

(72) Inventor: Max Gulde, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 1066 days.

(21) Appl. No.: 17/250,035

(22) PCT Filed: May 8, 2019

(86) PCT No.: PCT/EP2019/061790
§ 371 (c)(1),
(2) Date: Jun. 21, 2021

(87) PCT Pub. No.: WO2019/215210
PCT Pub. Date: Nov. 14, 2019

(65) Prior Publication Data
US 2021/0319590 A1 Oct. 14, 2021

(30) Foreign Application Priority Data
May 9, 2018 (DE) .................. 10 2018 207 265 U

(51) Int. Cl.
*G06T 7/00* (2017.01)
*G01J 5/00* (2022.01)
(Continued)

(52) U.S. Cl.
CPC ................. *G06T 7/97* (2017.01); *G01J 5/00* (2013.01); *G06T 3/4053* (2013.01); *G06T 5/50* (2013.01);
(Continued)

(58) Field of Classification Search
CPC .......... G06T 3/4053; G06T 5/50; G06T 7/97; G06T 2207/10032; G06T 2207/30181;
(Continued)

(56) References Cited

U.S. PATENT DOCUMENTS 7,194,107 B2 3/2007 Turner et al.
2003/0152292 A1 8/2003 Scott et al.
(Continued)

FOREIGN PATENT DOCUMENTS

WO 2014012070 1/2014

OTHER PUBLICATIONS

Bai, Yang, et al. "Advancing of land surface temperature retrieval using extreme learning machine and spatio-temporal adaptive data fusion algorithm." Remote sensing 7.4 (2015): 4424-4441. (Year: 2015).*

(Continued)

*Primary Examiner* — Vu Le
*Assistant Examiner* — Tracy Mangialaschi
(74) *Attorney, Agent, or Firm* — Schwegman Lundberg & Woessner, P.A.

(57) ABSTRACT

The invention relates to a method and a device for producing a thermal map of an area, wherein the thermal map is generated by a combination of two thermal images of different properties, and both thermal images comprise pixels associated with the area and have been recorded by satellites. The two thermal images are recorded at different times using different recording devices. Furthermore, a radiometric precision of the first thermal image is higher than that of the second thermal image, and a spatial resolution of the second thermal image is higher than that of the first thermal image. The two thermal images are used to determine a measurement value offset of a first pixel group belonging to the second thermal image and spatially asso- (Continued)

ciated with the area, and then corrected absolute measurement values of the pixels belonging to the second thermal image and spatially associated with the area are determined. A precise thermal map of the area is then created on this basis. The invention also relates to a method for determining a time series of thermal maps and a computer programme product for carrying out the method described.

20 Claims, 3 Drawing Sheets

(51) Int. Cl.
  *G06T 3/4053* (2024.01)
  *G06T 5/50* (2006.01)
(52) U.S. Cl.
  CPC ............ *G01J 2005/0077* (2013.01); *G06T 2207/10032* (2013.01); *G06T 2207/10048* (2013.01); *G06T 2207/20212* (2013.01); *G06T 2207/30181* (2013.01)
(58) Field of Classification Search
  CPC . G06T 2207/10048; G06T 2207/20212; G06T 2207/10016; G01J 5/00; G01J 2005/0077
  See application file for complete search history.

(56) References Cited

U.S. PATENT DOCUMENTS

| | | |
|---|---|---|
| 2013/0250104 A1 | 9/2013 | Williams |
| 2014/0027576 A1 | 1/2014 | Boshuizen et al. |

OTHER PUBLICATIONS

Weng, Qihao, Peng Fu, and Feng Gao. "Generating daily land surface temperature at Landsat resolution by fusing Landsat and MODIS data." Remote sensing of environment 145 (2014): 55-67. (Year: 2014).*

Liu, Kai, et al. "Quantifying spatial-temporal pattern of urban heat island in Beijing: An improved assessment using land surface temperature (LST) time series observations ." IEEE Journal of Selected Topics in Applied Earth Observations and Remote Sensing 9.5 (2016): 2028-2042. (Year: 2016).*

"German Application Serial No. 10 2018 207 265.5, Office Action mailed Apr. 24, 2019", (Apr. 24, 2019), 10 pgs.

"International Application Serial No. PCT/EP2019/061790, International Search Report mailed Aug. 2, 2019", w/ English Translation, (Aug. 2, 2019), 8 pgs.

"International Application Serial No. PCT/EP2019/061790, Written Opinion mailed Aug. 2, 2019", (Aug. 2, 2019), 7 pgs.

Bhaskar, Ranjit, "A Study of techniques to improve the effective resolution of thematic mapper thermal infrared imagery.", Thesis, Rochester Institute of Technology, (Nov. 1, 1993).

Munechika, Curtis K., "Merging panchromatic and multispectral images for enhanced image analysis", M.S. Degree Thesis, Center for Imaging Science, College of Graphic Arts and Photography, Rochester Institute of Technology, (Aug. 1990), 217 pgs.

Pohl, Cle, et al., "Review article multisensor image fusion in remote sensing: concepts, methods and applications", International journal of remote sensing 19.5, (1998), 823-854.

Schlingmeier, David, et al., "Resolution enchancement of thermal infrared images via high-resolution class-map and statistical methods", Thesis, Rochester Institute of Technology, (May 8, 1997), 234 pgs.

Spinhime, James D., et al., "Performance and results from a space borne, uncooled microbolometer array spectral radiometric imager", 2000 IEEE Aerospace Conference. Proceedings (Cat. No. 00TH8484). vol. 3. IEEE, (Mar. 18, 2000), 7 pgs.

Zhan, Wenfeng, et al., "Sharpening thermal imageries: A generalized theoretical framework from an assimilation perspective", IEEE Transactions on Geoscience and Remote Sensing 49.2, (2010), 773-789.

Zhukov, Boris, et al., "Unmixing-based multisensor multiresolution image fusion", IEEE Transactions on Geoscience and Remote Sensing 37.3, (1999), 1212-1226.

"Indian Application Serial No. 202017048798, Office Action dated Sep. 2, 2022", (Sep. 2, 2022), 8 pgs.

D'Errico, Marco, "Distributed space missions for earth system monitoring", ISBN 978-1-4614-4540-1.New York; Heidelberg; Dordrecht; London: Springer Science+Business Media, 2013.Part IV, Chapter 12:, (2012), pp. 375-386.

Ghassemian, Hassan, "A review of remote sensing image fusion methods", Information Fusion 32, (2016), 75-89.

Gwinner, Klaus, "The High Resolution Stereo Camera (HRSC) of Mars Express and its approach to science analysis and mapping for Mars and its satellites", Planetary and Space Science 126, (2016), 93-138.

Hulley, Glynn C., "Generating consistent land surface temperature and emissivity products between ASTER and MODIS data for earth science research", IEEE Transactions on Geoscience and Remote Sensing 49.4, (2010), 1304-1315.

NASA, "Formation Flying: The Afternoon "A-Train" Satellite Constellation.", National Aeronautics and Space Administration, Goddard Space Flight Center, NASA Facts FS-2003-1-053-GSFC., (Mar. 2003).

Zhukov, Boris, "TM LANDSAT thermal image unmixing", Algorithms for Multispectral and Hyperspectral Imagery II. vol. 3071. International Society for Optics and Photonics, (Aug. 4, 1997).

"Japanese Application Serial No. 2020-562185, Office Action dated Feb. 6, 2023", w English Translation, (Feb. 6, 2023), 4 pgs.

\* cited by examiner

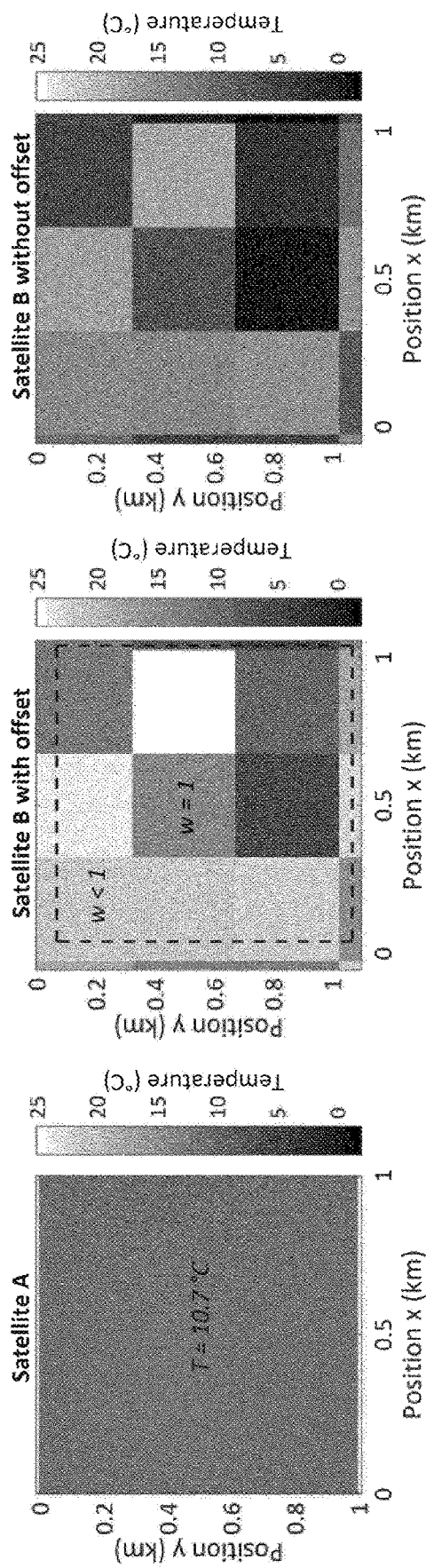

CORRELATION OF THERMAL SATELLITE IMAGE DATA FOR GENERATING THERMAL MAPS AT HIGH SPATIAL RESOLUTION

PRIORITY APPLICATIONS

This application is a U.S. National Stage Filing under 35 U.S.C. § 371 from International Application No. PCT/EP2019/061790, filed on May 8, 2019, and published as WO2019/215210 on Nov. 14, 2019, which claims the benefit of priority to German Application No. 10 2018 207 265.5, filed on May 9, 2018; the benefit of priority of each of which is hereby claimed herein, and which applications and publication are hereby incorporated herein by reference in their entirety.

TECHNICAL FIELD

The present invention relates to the determination of high spatial resolution heat maps, using thermal satellite image data.

BACKGROUND

A land surface temperature (LST) that is determined as precisely as possible is a key component of many different applications, for example in the detection of wild fires, the measurement of local maxima in the urban temperature distribution (urban heat island, UHL), in the determination of vegetation indices in agriculture, or during the modeling of the local and global climate. Measuring the land surface temperature across a large surface area and with precision has only become possible with the use of satellites.

The temperature is, for example, not measured directly, but is derived from the radiance at the detector on board the satellite. Radiance RA is the radiant flux (energy) emitted by a surface in a given time in a given spectral region in a given direction, and is indicated in watts per square meter per steradian.

The detector itself records a grayscale image in which the brightness of a single pixel can be associated with a measured radiance.

The association of gray values DN to radiance R is carried out, for example, by a linear equation in the form of $$R = aDN + b,$$

wherein the constants a and b are ascertained by a calibration of the detector.

Using Planck's radiation law, and having knowledge of the wavelength A, it is possible to directly infer the temperature T via the following relationship:

$$R_\lambda = \frac{k_1}{\lambda^5 \left(e^{\frac{k_2}{\lambda T}} - 1\right)}$$

$$k_1 = 2hc^2$$

$$k_2 = hc/\sigma_B$$

Therein, h is Planck's constant, c is the speed of light in a vacuum, and $\sigma_B$ is the Boltzmann constant.

The measured output variable, from which the temperature can be derived, can depend on the type of the detector. In the case of what are known as microbolometers, for example, either a temperature-dependent electrical resistance is measured, or the temperature change of the absorber is measured directly by a thermometer. In the first instance, the temperature is inferred from a previously ascertained functional dependency between the resistance and the temperature.

SUMMARY

In the case of mercury cadmium telluride (MCT) detectors, semiconductor elements are employed, in which the captured amount of energy per pixel linearly correlates in good approximation with the brightness thereof. With knowledge of the field of view of the pixel and the exposure time, it is thus possible to infer the radiance, which, as described above, is related to the temperature.

Another detector type is the quantum well infrared photodetector (QWIP), in which likewise charge carriers are released when infrared (IR) light is incident, which then generate a measurable current.

Other detector types exist as well; however, they all tend to have in common that the temperature is determined as a derived variable by varying easy-to-measure physical parameters (resistance, voltage, and the like).

A general challenge when measuring the LST by way of infrared cameras from space is to achieve high absolute radiometric accuracy, that is, accuracy of the measured radiation temperature of the Earth's surface. The measured temperature should, on average, reflect the actual radiation temperature of the measured area as precisely as possible. Difficulties arise herein, among other things, due to temperature fluctuations of the detector, the passage of the IR radiation to be measured through the atmosphere, the wavelength-as well as viewing angle-dependent emissivity of the Earth's surface, different surface types (such as roads, fields, forests, structures, and the like) having different emissivities in the measured area, the reflected solar radiation, and the physical interpretation of the results. In this way, a radiation temperature is usually measured, and is then attempted to inter the surface temperature by way of a surface model.

Many of the aforementioned applications at the same time require a high temporal as well as a high spatial resolution, for example so as to record the diurnal cycle of UHIs or of the evapotranspiration. This requirement cannot be satisfied by satellite platforms currently in existence, nor by those planned for the coming years.

Even though geostationary satellites such as GOES or Meteosat have very high temporal repetition rates (5 minutes for MSG SEVIRI in the rapid scanning mode) and high radiometric precision, these have limited spatial resolution with projected pixel sizes of several square kilometers.

While spatially highly resolving platforms such as Landsat 7 or 8 (ETM+, TIRS) and Terra (ASTER) offer spatial resolutions of approximately 60 to 120 m, these only enable global coverage with a repetition rate of approximately two weeks.

In general, high-quality calibration methods for precisely measuring the surface temperature on board the satellite are very complex and can, so far, only be implemented within large satellites. These platforms have the disadvantage that, with a high spatial resolution (such as Landsat 7 and 8), a very long time passes in low orbits until the same territory can be observed again, and using a configuration made up of a plurality of such systems would involve an extreme financial expenditure. More remote platforms (Meteosat, GOES), as described above, are adversely affected by the problem of poor spatial resolution.

Multiple approaches thus exist for generating radiometrically precise thermal data with high spatial resolution, and optionally also with high temporal resolution. The approaches all have in common that these combine existing precise thermal satellite data of major platforms, such as Meteosat and Landsat, which have complex calibration methods on board, with spatially higher resolved auxiliary data. Such downsampling of thermal data can be utilized to obtain spatially higher resolved thermal images, and to use these, for example, within the scope of an additionally highly temporally resolved time series.

At present, two method types exist that achieve this increase in spatial resolution. Thermal sharpening (TSP) uses high resolution physical environment models to infer temperatures in a rectangular sub-pixel network. These can be maps, for example, including precise information regarding emission coefficients or the local albedo. It is assumed, in this case, that the recorded coarse temperature pixel can be expressed as a linear combination of the sub-pixel constituents thereof. These are divided into classes, depending on the parameter set (for example "forest," "meadow," "street," "structure") and are correlated, for example, by way of multiple linear regression or Sequential Monte Carlo methods.

The emission coefficient $\epsilon$ determines the relationship between the measured radiation temperature $T_S$ and the kinetic surface temperature $T_O$ of a body, using the following relationship:

$$T_S = \epsilon T_O$$

In remote sensing methods, usually the product of the temperature and the emission coefficient is measured. Since it is not possible to determine both variables simultaneously in a band independently of one another, the problem is then under-determined. Accordingly, additional information is required. Various options exist for determining the emission coefficient.

One option is by way of a map of the observed territory, including detailed information regarding the type of landscape (CORINE is such a map for Europe, which is updated approximately every 2 years). If the type of landscape is known, it is possible to read out the associated emission coefficients (or, closely related thereto, the reflection coefficients) from so-called spectral libraries (Gillespie et al. 1998) and to associate these. As an alternative, the emission coefficient and the temperature can be separated, using multiple spectral bands (at least 3). For territories covered with vegetation, the emission coefficient is also frequently inferred by way of the normalized difference vegetation index (NDVI) (Valor & Caselles 1996).

The use of TSP can yield relatively precise results with a moderate increase in resolution (approximately a factor of 10) and favorable data availability, with average LST errors (root mean square error, RMSE) of approximately 2 to 3 K.

The fewer classes and sub-components are selected, the more precise the results are. In the case of an actual application to Meteosat data, the factor of the increase in resolution (downsampling), however, is approximately 40 to 100, depending on the application, and a large number of classes exist within a coarse pixel (pixel size of SEVIRI a minimum of 9.6 km$^2$, over Central Europe approximately 15 km$^2$). In the best case, the mean error is approximately 5 K, with the possibility of individual outliers deviating by 20 K and more.

As an alternative, it is attempted to infer irregularly shaped sub-pixel components by way of spectral unmixing (temperature unmixing, TUM). In this method, for example, multiple thermal bands are concurrently analyzed to achieve an increase in resolution of the output data. As an alternative, it is also possible to use chronological image sequences of the same region, different viewing angles or different resolutions in further, synchronously recorded thermal bands so as to improve the spatial resolution of a region. However, few satellite sensors exist that record regions from multiple viewing angles, the required emission coefficient is difficult to determine when multiple bands are used, and chronologically successions are difficult to parameterize when the surface parameters are variable over time.

Less expensive small satellites with high spatial resolution, in contrast, are not able to record images with high radiometric precision. When smaller satellite platforms are used, such as pico- or nano-satellites, approaches for creating high spatial resolution thermal data are therefore usually based on the calibration of high spatial resolution IR images, together with reference objects having a known temperature. By identifying the reference objects within the IR image, this can then be accordingly calibrated. As an alternative, a second sensor is used, which supplies precise temperature information of an image section. In addition, cooled detectors are used on small satellites, but this is usually not sufficient to determine the temperature with a precision of less than a few Kelvin.

A need therefore exists for simple, cost-effective solutions for creating thermal images at high spatial resolution and high radiometric precision, as well as for creating time series with high temporal resolution, composed of various high spatial resolution thermal images with high radiometric precision.

The present patent application achieves this object according to the independent claims. Advantageous refinements are additionally described in the dependent claims and this description.

The provided solution thus consists in the use of small satellites for creating high spatial resolution heat maps of the Earth's surface, with high radiometric precision at the same time. The introduced principle is based on the combination of 1) thermal data having a high absolute measuring accuracy, but low spatial resolution, recorded byway of satellites, with 2) thermal data recorded in a temporally and spatially coregistered manner, that is, synchronously in terms of time and of the same territory, from a second satellite platform, having a lower measuring accuracy, but considerably higher spatial resolution.

Measurands are, for example, the gray values of a photo sensor, which can be associated with physical radiance (and thus a radiation temperature), the electrical resistance, or a voltage, which can be directly associated with a temperature, or further physical measured variables used for the contactless measurement of the temperature.

The method described here as well as the device combine the advantages of both measurements and thus result in both high temperature precision and a high spatial resolution. Thereby, the uncertainties that arise with the customary methods for the spatial disaggregation of satellite-supported LSTs can be avoided, at least to a large extent. In addition, a method for creating a time series of high spatial resolution heat maps as well as a computer program product for carrying out the described methods are described.

The described method is designed to determine the heat map of a territory, preferably to determine a high spatial resolution heat map with high measuring accuracy, such as for example a high temperature accuracy.

The method comprises receiving a first thermal image and receiving a second thermal image, wherein the thermal images are provided by different platforms, and thus have different properties.

A thermal image is a graphical representation of a physical unit about a region and can represent different physical units, such as radiance ($W/m^2sr$) or a temperature (K).

The first thermal image, which is recorded by a recording device of a first satellite, has a high radiometric precision, but a low spatial resolution. The first thermal image shows the recorded thermal radiation of a first landscape encompassing the territory, wherein the first thermal image comprises pixels that are spatially associated with the territory, and the first thermal image associates a respective measured first temperature value, radiance, or a value of another radiometric measured variable, pixel by pixel with the territory.

The second thermal image, which is recorded by a recording device of a second satellite or, as an alternative, a drone, a balloon, or another manned or unmanned aerial vehicle, has a lower radiometric precision, but a higher spatial resolution, compared to the first thermal image. The second thermal image shows the recorded thermal radiation of a second landscape encompassing the territory, wherein the second thermal image comprises pixels that are spatially associated with the territory, and the second thermal image associates a respective measured second temperature value pixel by pixel with the territory.

The "territory" for which the heat map is to be determined can be both a small portion of a landscape, for example a single structure or field, or also a larger portion of the landscape shown on the thermal images, such as a town, a district, or also an entire city. The "territory" can thus extend across various pixels of at least the second thermal image.

Different values can be associated in each case with the individual pixels of the two thermal images. In addition, the spatial resolution of the second thermal image is higher than the spatial resolution of the first thermal image, so that in each case a plurality of pixels of the second thermal image is spatially associated with a pixel of the first thermal image.

The first and second thermal images were furthermore recorded synchronously, or with only little time lag below an established limit of preferably a few minutes, for example 10 minutes. The tolerance in terms of time is provided by the characteristic time period during which the temperature or the radiation emission properties in the territory change significantly. This time period can differ as a function of the general conditions, such as the weather conditions, as well as the intended application.

The high radiometric precision, and thus the temperature accuracy or, in more general terms, the measuring accuracy of the first thermal image results, for example, from the recording device of the first satellite, which is preferably a large satellite, for example a weather satellite, and which is equipped with complex calibration technology, for example using specially temperature-controlled blackbodies or sensors. Satellites able to record images with high measuring accuracy, for example temperature accuracy, are known from the prior art; however, the required calibration technology is very cost-intensive and too large for small satellites, such as pico-, nano- or micro-satellites. The first satellite can be a geostationary satellite, which furthermore allows a high temporal repetition rate of the recorded thermal images. However, geostationary weather satellites are not able to record images with high spatial resolution due to the large distance thereof from Earth. For example, the spatial resolution of the first thermal image is in the range of one to several square kilometers per pixel.

As an alternative, the first satellite can be a large satellite in a low Earth orbit, as is known, for example, from the Landsat satellites. Such a satellite, which is likewise configured to record thermal images with high radiometric precision by way of calibration technology, makes a considerably better spatial resolution possible than a geostationary satellite. At the same time, however, the spatial resolution also still offers room for improvement for many applications. In addition, such large satellites, in a low Earth orbit, are only able to record the same portion of the Earth's surface at an interval of several days to several weeks, whereby it is not possible to record at a desired point in time, or to prepare a time series of multiple recordings, or this is only possible with a very low temporal resolution, or by combining several such satellites. However, since large satellites are very cost-intensive, it requires great financial expenditure to use the plurality of large satellites in a low Earth orbit (at a distance of less than 2000 km from Earth) which is necessary to achieve improved temporal accuracy.

The second thermal image can be recorded by a small satellite, circling closer to Earth, of considerably less than 1000 kg, or less than 500 kg, such as a picosatellite of up to approximately 1 kg, a nano-satellite up to approximately 10 to 15 kg, or a micro-satellite up to approximately 100 kg. Due to the proximity to Earth, a higher spatial resolution can be made possible. Such satellites circle in a lower Earth orbit at a distance of typically between 300 and 1000 km from the Earth's surface, for example at a distance between 500 and 800 km from the Earth's surface. In general, smaller satellites and satellites having a shorter service life circle closer to Earth than larger satellites and/or satellites having a longer service life. However, the technical options and the space for complex technology, such as calibration technology, on board are limited in the case of the small satellites, which are less expensive by several orders of magnitude (as of 2018, the costs for a geosatellite are in the range of approximately 1000 million euros, while a nano-satellite costs approximately between 1 and 10 million euros), so that the thermal images measured by a small satellite may deviate significantly from the actual measured variable, such as the temperature or radiance. Deviations can arise, for example, due to temperature fluctuations of the infrared sensor used for recording. Since small satellites circle considerably closer to Earth than weather satellites, for example, a small satellite is able to record the thermal images with a considerably higher resolution of edge lengths of the individual pixels of less than 100 m, preferably less than 50 m, between 30 m and 50 m, or less than 30 m. When post-processing the recorded images, an even higher spatial resolution, for example less than 20 m or less than 10 m, is also possible, for example by using or superimposing multiple recorded images. The second satellite, of which the recording device was used to record the second thermal image, is, in general, in a low Earth orbit, and in particular in a lower Earth orbit than the first satellite, whereby a single satellite only makes a lower revisit period of at least several hours or days possible or, for example 2 to 4 weeks, at a relatively high resolution of approximately 100 m, for example, for the images of a territory. The revisit period can be regarded as a function of the resolution. When images with high spatial resolution are recorded, necessarily a small territory is recorded due to the limited detector size. Accordingly, it takes a relatively long time until this territory is covered again (unless the orbit was set precisely in such a way that a certain territory is passed over more frequently, at the expense of the overall coverage of the Earth's surface). The revisit time is thus a function of the field of view of the detector and can thus be directly coupled to the resolving power.

The method for determining the heat map furthermore comprises determining a measured variable offset, such as a temperature offset, of a first pixel group of the second thermal image which is spatially associated with the territory, wherein the first pixel group comprises a plurality of pixels. As described above, the absolute measuring accuracy, for example the temperature accuracy, of the second thermal image is low and, if the measured variable is a temperature, for example, can deviate from reality by several degrees, for example more than 2 K or, more frequently, more than 5 K, or even more than 10 to 20 K. However, it can be assumed that the relative measured values, for example relative temperature values, of the second thermal image are sufficiently accurate, in particular the relative measured values of adjoining pixels, or of pixels located in the vicinity of one another, for example within a few pixels of one another.

By comparing a measured variable mean value, for example the temperature mean value, for the first pixel group to a value of the same measured variable of the reference pixels of the first thermal image, it is possible to determine a measured variable offset for the first pixel group. It is also possible, for example, to take adjoining pixels, both with respect to the first thermal image (that is, adjoining pixels of the at least one first pixel) and with respect to the second thermal image (that is, adjoining pixels of the first pixel group), into consideration during the determination of the measured variable offset. The "coarser" reference pixels of the first thermal image can be expressed in this case as a linear combination, or as a weighted sum of the first pixel group. The pixels of the first pixel group are considered during the calculation of the mean value with the weighting of the percentage of the area thereof. In this way, it is also possible to take pixels of different sizes into consideration. The measurands can either be scalar measured variables, for each pixel, or it is possible to simultaneously detect multiple values, so that the individual measured values are then available in vector form.

The method furthermore comprises the step of determining corrected absolute measured values of the pixels of the first pixel group which are associated with the territory, based on the second measured values of the pixels of the first pixel group and the measured value offset.

The corrected absolute measured values of the pixels of the first pixel group are preferably determined by adding the second measured values and the previously determined measured value offset.

The method additionally comprises a step for determining or generating the high spatial resolution heat map with high radiometric precision based on the corrected absolute measured values.

For example, the measured variable is a temperature, measured in Kelvin, for example. In this case, the temperature offset between the two thermal images is then determined. However, it can also be a radiation variable, measured in watts per square meter and per steradian, for example, an electrical resistance, measured in ohm, for example, or a voltage, measured in volt, for example.

By combining two recorded thermal images having different properties, it is thus possible to create a considerably enhanced heat map of the territory.

In particular, the radiation temperature of the land surface is determined by the method, in particular by means of infrared, for example. Depending on the application, the land surface temperature can additionally be precisely determined from the radiation temperature provided by the determined heat map, with the aid of an emissivity of the particular surface, as a function of the type of the particular surface.

It must be noted here that infrared sensors initially measure specific intensities or radiances, which are integrated over the respective, preferably congruent, surfaces for the comparison of the measured radiances of the first and second thermal images. A radiation temperature, which can be averaged for the particular areas, can then be determined from the measured values.

For this purpose, a pixel is illuminated, for example, with a certain amount of energy in the infrared range, and thus has a certain brightness. From the known pixel response (for example, measured in the laboratory prior to starting the process), which is normally almost linear in the range to be considered, it is now possible to infer physical units from the pixel brightness, for example by means of a smoothing function or a lookup table. In the present case, this is the spectral radiance ($W/(m^2 \text{ sr m})$). The (radiation) temperature thus results directly from Planck's radiation law. The surface temperature can then be determined from this as well as an emission coefficient.

Due to the high spatial resolution as well as the high radiometric precision of the thermal images generated by the described method, it is possible to determine the surface temperature with considerably reduced effort, compared to the methods known from the prior art.

Preferably, exactly one pixel of the first thermal image is spatially associated with the first pixel group of the second thermal image. In this case, the measured value offset of the first pixel group of the second thermal image is preferably determined by a, potentially weighed, sum of relative measured values of the first pixel group of the second thermal image, compared to the first measured value of the pixel of the first thermal image which is spatially associated with the first pixel group of the second thermal image.

This calculation is carried out under the assumption that a mean value of the measured values of the pixels of the first pixel group of the second thermal image is known as a result of the value of the first pixel of the first thermal image which was measured with high measuring accuracy. It is then possible to derive the measured value offset $\Delta T$. This offset is given by the difference of, on the one hand, the mean values of the measured value of the first pixel of the first thermal image compared to, on the other hand, the measured values of the pixels of the first pixel group of the second thermal image.

$$\Delta T = T_A(x,y) - 1/N \Sigma_{(i,j) \text{ in } T_A(x,y)} w(i,j) T_B(i,j) \quad (1)$$

The following applies:

$$\Sigma_{(i,j) \text{ in } T_A(x,y)} w(i,j) = N. \quad (2)$$

$T_A(x,y)$ is the recorded measured variable of the first thermal image of the pixel $(x,y)$ and $T_B(i,j)$ is that of the measurement of the second thermal image in all pixels $(i,j)$ which are located within the first pixel group, wherein $w(i,j)$ represents the particular percentage of the area of the pixel $(i,j)$ in relation to the total surface spatially associated with the first pixel. As a result $w(i,j)=1$ applies when the pixel $(i,j)$ is completely contained in the total surface of the first pixel.

If the temperature is selected as the measurand, this linear approach applies in good approximation to a mean temperature range around 300 K found on Earth, as it can normally be found on a single thermal image, with a difference between the maximum and minimum recorded temperatures of several ten Kelvin, for example 20 K or 30 K.

If, instead, the radiance is selected as the measurand, the mathematical formulation corresponds to the principle of conservation of energy, and this applies exactly.

It is furthermore preferably possible that the method, after the corrected absolute temperature values of the pixels of the first pixel group have been calculated, optionally comprises post-processing of the pixels of the first pixel group, using land surface models. Such land surface models can be used to calculate precise surface temperatures from corrected absolute temperature values, which indicate a radiation temperature, for example, using emission coefficients associated with the particular surfaces.

The present application furthermore encompasses a device for determining the heat map of a territory, wherein the device comprises at least one receiving unit and at least one determination unit.

The receiving unit is configured to receive a first thermal image of a first landscape encompassing the territory, wherein the first thermal image was recorded by a recording device of a first satellite, wherein the first thermal image comprises pixels that are spatially associated with the territory, and the thermal image, pixel by pixel, assigns a respective first recorded measured value to the territory.

The at least one receiving unit is furthermore configured to receive a second thermal image of a second landscape encompassing the territory, wherein the second thermal image was recorded by a recording device of a second satellite, wherein the second thermal image comprises pixels that are spatially associated with the territory, and the second thermal image, pixel by pixel, assigns a second recorded measured value to the territory.

Only little time lag below an established limit of preferably a few minutes, for example less than 30 minutes or less than 10 minutes, exists between the recording of the first thermal image and the recording of the second thermal image.

As was already described with respect to the method, in addition a radiometric precision of the first thermal image is higher than a radiometric precision of the second thermal image, and a spatial resolution of the second thermal image is higher than a spatial resolution of the first thermal image.

The determination unit of the device for determining the heat map of the territory is configured to determine a measured value offset of a first pixel group of the second thermal image which is spatially associated with the territory, the first pixel group comprising a plurality of pixels, by way of a sum or a linear combination of relative measured values of the pixels of the first pixel group, compared to the first recorded measured value of the at least one first pixel of the first thermal image, wherein the at least one first pixel of the first thermal image is at least partially spatially associated with the first pixel group of the second thermal image.

If the measurands are temperature values, the determination of a temperature offset can be carried out, for example, based on formulas (1) and (2).

It must be noted that, when radiation data are collected, the radiation temperature can selectively be calculated prior to or after the ascertainment of the offset. It is thus possible, as described in formulas (1) and (2), that the sensor data are converted into temperature values, and a temperature offset is then determined by comparing the temperature values of the first and second thermal images. As an alternative, however, a measured value offset can also be achieved based on another measured or derived variable, and the conversion into temperature values can be carried out thereafter.

The determination unit is furthermore configured to determine corrected absolute measured values of the pixels of the first pixel group, based on the second recorded measured values of the pixels of the first pixel group and the measured value offset.

Optional advantageous embodiments are described hereafter for the method and the device for determining the heat map.

Preferably both the first and the second thermal image are infrared images, which were recorded by infrared sensors of the first and second satellites, respectively.

For normal LSTs in the range of large-surface-area temperatures occurring on Earth, for example −40 to 60° C., for example, infrared waves in the range of 8 to 14 μm, and often even only 10.8 and 12 μm, are used. The shorter-wave infrared range is of greater interest for wild fires, for example between 3 and 5 μm. Most weather satellites thus have multiple bands that cover the range of 0.5 to 13 μm. The recorded measured values can thus be present in vector form.

The spatial resolution of the first thermal image is generally considerably, by at least one or even two or three orders of magnitude, coarser than the spatial resolution of the second thermal image. For example, the pixels of the first thermal image can have an edge length of at least approximately 1 km, so that the area covered by one pixel in the case of the first thermal image is in the range of approximately 1 $km^2$, or even more than 1 $km^2$, or more than 3 $km^2$. In contrast, the edge length of one pixel of the second thermal image is preferably less than 100 m, or even less than 70 m, or less than 50 m. The edge length of one pixel of the second thermal image is ideally in the range of only 10 m, so that the area mapped by one pixel of the second thermal image is only a few 100 $m^2$.

As an alternative, however, the method described herein can also be employed when the spatial resolution of the first thermal image is coarser than the spatial resolution of the second thermal image by less than one order of magnitude, for example by only a factor or 2 or 3. The method can be applied to any image pair in which the spatial resolution of the second thermal image is higher, or less coarse, than the spatial resolution of the first thermal image.

Additionally, the radiometric precision of the first thermal image is higher than the radiometric precision of the second thermal image. This property of the thermal images is preferably achieved by the recording device of the first satellite comprising corresponding calibration technology, for example through the use of blackbodies or specially cooled or temperature-controlled sensors, which ensures high radiometric accuracy, preferably of less than 2 K or, particularly preferably, even of less than 1 K, ideally per pixel or also on average across the recorded thermal images. So as to increase the assessability of the accuracy, the recording devices of the satellites can furthermore also supply data that indicate a measuring accuracy estimated by sensors of the recording device, preferably per recorded pixel. The radiometric precision of the second thermal image is lower, for example as a result of the second thermal image being recorded by the recording device of a more cost-effective small satellite or another manned or unmanned aerial vehicle not equipped with corresponding precise calibration technology.

The present application furthermore comprises a method for determining the change of a measurand within a territory over a time period, such as within an hour, a day, or also within a week, a month, or a year, for example. By determining the change of the measurand of a territory over time as precisely as possible, urban heat islands can be detected, for example, and the causes thereof can be analyzed. Such measurand time series also supply findings for city planning, for example the effect of green spaces, various roof types or expanses of water on the urban climate.

The described method for determining the change in the measurand within a territory initially comprises determining at least two, and preferably a plurality of more than 10, or more than 100, heat maps of the territory, which are as precise as possible, at different points in time, wherein the two heat maps were determined according to the above-described method.

In particular, the first heat map was determined using a first and a second received thermal image of the territory, wherein the first and second thermal images were recorded synchronously, or approximately synchronously, at a first point in time, and, out of the first and second thermal images, the first thermal image has a higher radiometric precision, and the second thermal image has a higher spatial resolution.

Furthermore, the second heat map was determined using a third and a fourth received thermal image of the territory, wherein the third and fourth thermal images were recorded synchronously, or approximately synchronously, at a second point in time, and, out of the third and fourth thermal images, the third thermal image has a higher radiometric precision, and the fourth thermal image has a higher spatial resolution.

It is then possible to create a time series of the measurand within the territory from the first and second heat maps of the territory.

Optionally, it is also possible in this way to determine heat maps of a plurality of points in time for a territory, and to create a time series of the measurand within the territory based on the plurality of heat maps of the territory.

The first and second points in time are preferably within an established time period, for example within a day, or within a few hours, or even within less than one or a half hour, so as to ensure a high temporal resolution of the time series of the measurand within the territory, for example so as to detect the change of the measurand within one day.

So as to achieve such a high temporal resolution, it is possible, for example, for the first and third thermal images to each be recorded by a large satellite platform comprising corresponding calibration technology, to ensure high radiometric precision, such as a geostationary weather satellite, for example. When using a first and a third thermal image recorded by geostationary satellites, preferably both the first and the third thermal image are recorded by the recording device of the same geostationary satellite. As an alternative, the first and third thermal images can also stem from different geostationary satellites having similar coverage.

Furthermore, it is also possible, as an alternative, for the first and third thermal images to be recorded by the recording devices of different large, but not geostationary, satellites in a low Earth orbit, wherein the recording device should each be equipped with calibration technology for high measuring accuracy. When the first and third thermal images stem from different non-geostationary satellite platforms, this is only possible if these two satellite platforms were located over the territory within the predefined time period. Since non-geostationary large satellites, such as Landsats, have a revisit time with respect to a predefined territory of several days to several weeks, such images are possible, in particular opportunistically, within a predefined time window by different non-geostationary satellites using the presently available satellite infrastructure, but are not suitable for creating continuous time series over a selected territory comprising multiple, for example more than 10 or more than 100, image pairs, wherein the time intervals for two consecutively recorded image pairs in each case are a few minutes or hours.

Just how many image pairs are required to create a time series, as well as the tolerable time intervals of the image pairs, is generally highly dependent on the application. For some applications in which a temperature trend is to be observed over the year, for example, one or two images per day may suffice, while a temporal resolution of just a few minutes, for example less than 10 or less than 30 minutes, is desirable for other applications in which, for example, a heat trend over the course of the day is to be examined. So as to create a longer time series, consisting of more than 10 or more than 100 image pairs, it is helpful when the first thermal image, of each synchronously recorded image pair, having the higher radiometric precision was always, or at least in most instances, recorded by the same geostationary satellite.

So as to achieve high spatial resolution at the same time, the second thermal image and also the fourth thermal image are each recorded by recording device of small satellites or other manned or unmanned aerial vehicles, which due to the vicinity thereof to Earth are able to provide a high spatial resolution of the recorded thermal images.

These aforementioned small satellites in general circle the Earth in a low orbit. So as to achieve a high temporal resolution, the thermal images of multiple different small satellites, such as pico-, nano- or micro-satellites, can preferably be used, so that the second thermal image was recorded by the recording device of a first small satellite, while the fourth thermal image was recorded by the recording device of a second small satellite. Since small satellites, such as CubeSats, are more cost-effective to produce than geostationary large satellites, it is possible to use various small satellites to generate a time series with high temporal resolution of the measurand within a territory.

The present description furthermore comprises a computer program product for calculating a thermal image, wherein the computer program product includes instructions that, when executed on a computer, carry out the above-described method. The instructions can selectively be instructions for determining a spatially highly resolved, and also precisely measured, thermal image of a territory, or the instructions can be instructions for determining a time series of the measurand within the territory. In any case, the instructions are based on thermal images of different satellite platforms, which are received by a corresponding receiving unit of the computer.

The computer can be a stationary PC or a mobile computer. The computer can also form part of a distributed system or a cloud-based service, which is suitable for executing program instructions.

The features described above with respect to the method or the device for creating a heat map can furthermore also be employed with respect to the method, the device, or the computer program product.

BRIEF DESCRIPTION OF THE DRAWINGS

Further advantageous embodiments will be described hereafter based on the figures. In this case, the temperature was selected as the measurand due to the easy interpretability thereof. As an alternative, however, the measurands can also comprise other radiometric data, such as radiances or other data detected by the sensors of the satellites that are used or derived from the detected measurands. In the drawings:

FIG. 4A shows a schematic representation of a single pixel of the thermal image according to FIG. 3A recorded by satellite A;

FIG. 4B shows a schematic representation of the measurement of satellite B of the same region as is shown in FIG. 4A; and FIG. 4C shows a schematic representation of the determined heat map based on FIG. 4B and a determined temperature offset.

DETAILED DESCRIPTION

Figure 1:
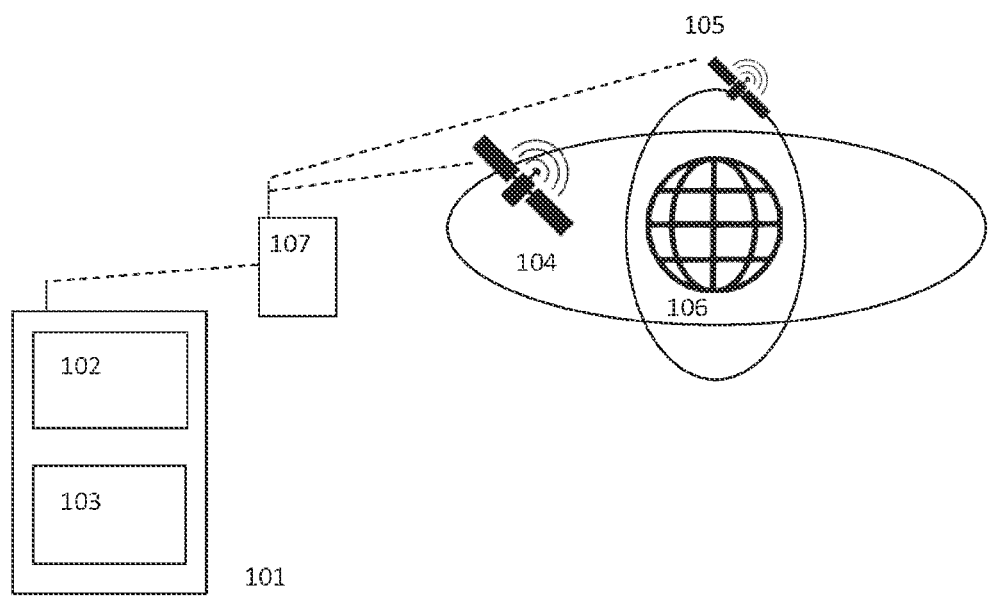
FIG. 1 shows a schematic representation of a device for determining a heat map of a territory.

FIG. 1 shows a device for determining a heat map of a territory. The device 101 comprises a receiving unit 102, which is able to receive signals of different satellites 104 and 105 circling Earth 106. The signals of the satellites 104, 105 are usually received indirectly, that is, not directly from the satellite, but via an intermediate device 107, which receives the signals of the satellite or satellites 104, 105 and then forwards them or makes them available for downloading. The receiving unit receives in particular thermal image data of the Earth's surface which were recorded by recording devices of the satellites 104 and 105. So as to create a detailed heat map of a territory with high spatial resolution in the range of a few meters to a few 10 meters and high radiometric measuring accuracy, such as a high temperature accuracy, the receiving device 102 is configured to initially receive a first thermal image of a first satellite 104 and a second thermal image of a second satellite 105.

Here, the first satellite 104 is a large satellite having high temperature accuracy, such as a geostationary weather satellite, for example, or a large satellite circling in a low Earth orbit, such as a Landsat. So as to achieve a temperature accuracy of preferably less than 2 K, the first satellite 104 comprises installed calibration technology. In the case of a geostationary first satellite, however, this first satellite 104, due to the large distance thereof from Earth, only has a relatively coarse spatial resolving power, so that the recorded pixels have a size of several square kilometers. If, as an alternative, a large satellite is used in a low Earth orbit, such as a Landsat, as the first satellite 104, the spatial resolution is already enhanced over the above-described geostationary satellites, but there is still potential for improvement, taking spatially higher resolving thermal images of a second satellite platform into consideration. For example, Landsat 8 presently has a resolution of 100 m. By using a small satellite as an auxiliary satellite, this resolution can be considerably improved to less than 60 m. Even lower resolutions, for example less than 30 m, are possible when post-processing the data.

The second satellite 105 is a small satellite or CubeSat, which has a higher spatial resolving power than the first satellite, but only a reduced measuring accuracy compared to the first satellite.

The receiving unit 102 of the described device receives temporally and synchronously recorded first and second thermal images of spatially coregistered landscapes of the two satellites 104 and 105, that is, the recorded partial territories of the Earth's surface overlap at least partially. So as to now create a precise heat map of a territory, which is depicted in both thermal images, the device 101 furthermore comprises a determination unit 103.

The determination unit 103 is configured to spatially associate a pixel of the first thermal image of the first satellite with a group of pixels of the second thermal image of the second satellite, and to calculate a measured variable offset or temperature offset of the group of pixels of the second thermal image. This calculation is carried out under the assumption that the temperature deviation or measured variable deviation of the pixels of the second thermal image is at least locally constant, that is, that the variance of a pixel does not differ, or differs only very little, from the variance of adjoining pixels. Furthermore, the assumption is made that the measured variable (measured with high precision) or temperature of the pixel of the first thermal image can be represented as a (weighted) sum or linear combination of the associated pixels of the second thermal image. In this way, the measured variable offset for the group of pixels of the second thermal image can be determined from the relative measured variable differences of the pixels of the group of the second thermal image and the recorded measured variable of the associated pixel of the first thermal image. The determination unit 103 is furthermore configured to create a precise heat map of the territory from the measured variable offset and the recorded measured variables of the second thermal image.

Figure 2:
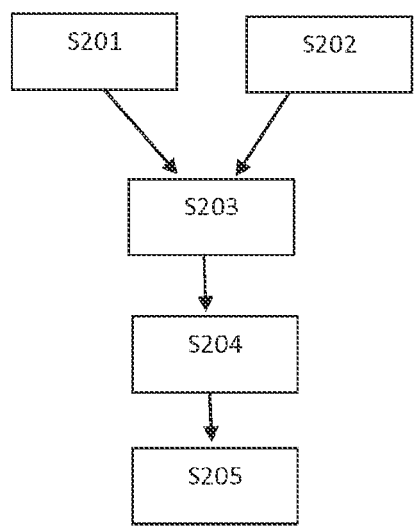
FIG. 2 shows a schematic representation of a sequence of the method for determining a heat map of a territory.
Figures 3A, 3B:
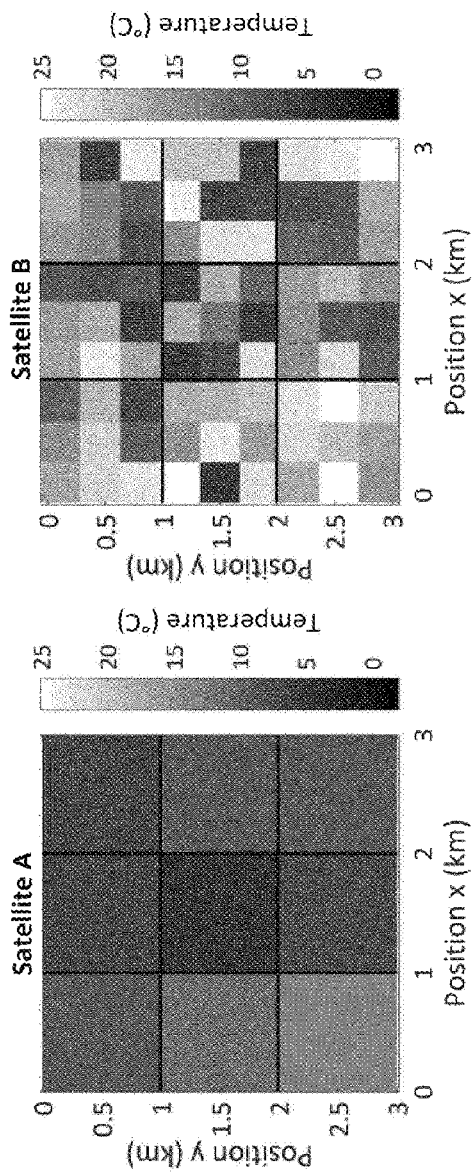
FIG. 3A shows a schematic representation of a thermal image of the Earth's surface recorded by way of a first satellite A.
FIG. 3B shows a schematic representation of a thermal image of the Earth's surface recorded by way of a second satellite B synchronously with FIG. 3B.

FIG. 2 schematically shows a method for determining a precise heat map of a territory, wherein the method can be implemented, for example, by the above-described system or by a computer program product, which includes corresponding instructions for carrying out the method.

The method described here for determining the precise heat map of a territory comprises the following steps:

S201: receiving a first thermal image of a first landscape encompassing the territory, which was recorded by a recording device of a first satellite, wherein the first thermal image comprises pixels that are spatially associated with the territory, and the thermal image, pixel by pixel, assigns a respective first recorded measured value to the territory.

S202: receiving a second thermal image of a second landscape encompassing the territory, which was recorded by a recording device of a second satellite, wherein the second thermal image comprises pixels that are spatially associated with the territory, and the thermal image, pixel by pixel, in each case assigns a second recorded measured value to the territory.

It must be noted that steps S201 and S202 can be carried out in any arbitrary order or also simultaneously.

The received first and second thermal images additionally have to meet the following requirements for carrying out the method: only a temporal offset below an established limit, preferably of less than 10 minutes or even of less than 5 minutes, may exist between the time at which the first satellite image is recorded and that at which the second satellite image is recorded, since the correlation of the thermal measured values given in the two thermal images is not possible, or is only possible with difficulty, if the time lag between the times at which the two images were recorded is greater. The temporal limit can be selected as a function of the present general conditions. Under constant weather conditions, longer lags between the times at which the two images are recorded may thus be tolerable, in some circumstances, than under changing weather conditions.

Furthermore, a radiometric precision of the first thermal image, that is, the accuracy of the recorded measured variable, is higher than a radiometric precision of the second thermal image, while a spatial resolution of the second thermal image is higher than a spatial resolution of the first thermal image.

Upon receipt of the two thermal images, the following further method steps can be carried out:

S203: determining a measured value offset of a first pixel group of the second thermal image which is spatially associated with the territory, the first pixel group comprising a plurality of pixels, by way of a weighted sum of relative measured values of the pixels of the first pixel group of the second thermal image, compared to the first recorded measured value of the at least one pixel of the first thermal image, which is at least partially spatially associated with the first pixel group of the second thermal image. The mean value of the measured values of the first pixel group is determined in this step, for example, so as to then determine the offset, for example in the form a difference, with respect to the measured value or measured values of the first territory of the first thermal image.

S204: determining corrected absolute measured values of the pixels of the first pixel group which are associated with the territory, based on the second measured values of the pixels of the first pixel group as well as the measured value offset.

S205: creating the precise heat map of the territory based on the corrected absolute measured values.

The above-described method for determining spatially highly resolving heat maps with high measuring accuracy is furthermore described based on FIGS. 3A, 3B, 4A, 4B and 4C. The method introduced here combines the radiometric accuracy of large satellite platforms with the spatial resolving power of a second satellite platform, for example a small satellite or CubeSat. The method is based on the assumption that the specific intensity (radiance) of a pixel results from the linear combination of the sub-pixel components thereof (linear mixing model). Ideally, a satellite platform having very high radiometric precision (Sentinel 3), while also offering high temporal resolution (Meteosat second and third generation) is used as the large satellite platform.

The only prerequisite for the additional, smaller satellite is that it is capable of recording synchronously, that is, records IR images of the same region at the same time. The recorded images are schematically represented for both satellites in FIGS. 3A and 3B, wherein in this case the temperature was selected as the relevant measured variable. Therein, satellite A (FIG. 3A) denotes the platform having high radiometric precision, and satellite B (FIG. 3B) denotes the platform having high spatial resolution.

The plotted grid shows which regions of the image of satellite B are to be associated with which pixel of satellite A. The data of satellite B have an unknown temperature offset $\Delta T$ during the measurement of the radiation temperature, which alone does not allow a precise absolute temperature determination for satellite B. Relative temperature differences, for example between adjoining pixels, are correctly measured by satellite B (ensured by prior calibration of the instrument).

As a result of the image recorded by satellite A, the mean value of each plotted grid cell from the image of satellite B is known. In this way, it is possible to infer the still unknown temperature offset $\Delta T$. This is given by the difference of the mean values of each cell of the two images, $$\Delta T = T_A(x, y) - \frac{1}{N} \cdot \sum_{(i,j) in T_A(x,y)} w(i, j) T_B(i, j).$$

The following applies $$\sum_{(i,j) in T_A(x,y)} w(i, j) = N.$$

$T_A(x,y)$ is the measured temperature of satellite A in the cell (x,y) and $T_B(i,j)$ of the temperature measurement of satellite B in all pixels (i,j) that are located within this cell (x,y) of satellite A with a respective percentage of the area of $w(i,j)$.

The measurement method is schematically shown for a single cell in FIGS. 4A, 4B and 4C: The mean value of all shown pixels of satellite B (FIG. 4B) does not yet correspond to the value of the corresponding pixel of satellite A (FIG. 4A). By subtracting a temperature offset resulting from the difference, the entire cell of the image of satellite B is calibrated and now has the same mean value as recorded by satellite A (FIG. 4C).

There are several advantages over existing approaches:

The introduced method combines the advantages of both measurements, these being high radiometric precision on the one hand, and high spatial resolution on the other hand, without having to resort to further data sources. With this, it is possible to achieve resolutions in the order of magnitude of several meters, which is in particular of great importance for applications in the area of UHIs and satellite-based farming.

Due to the high spatial resolution of satellite B, no or only very limited downsampling has to be carried out, and the number of the surface classes per pixel is considerably reduced with a high resolution, which increases the stability and accuracy of the land surface temperature, which can be determined by taking into consideration land surface models and known emissivities of the radiation temperature given by the determined heat map.

In addition, a use of the unstable correlation between visual and IR images is avoided, and the effect of temperature homogenization due to the selection of an insufficient number of surface classes is considerably mitigated. In addition, errors due to a large resolution gap between the ground resolution of the satellite sensor and the resolution of the auxiliary data is avoided.

Thermal data with high radiometric precision, which can serve as a calibration benchmark for the concept, already exist. Copernicus, for example, offers temperature data with an accuracy of <0.2 K, at a resolution of 1 km², by way of Sentinel 3. These data are freely and publicly accessible via the Copernicus program. Meteosat 9, for example, offers a resolution of 9 to 15 km², at a temperature accuracy of approximately 2 K and a temporal resolution of a few minutes, while providing large-surface-area coverage.

At a repetition rate of approximately 10 to 15 minutes, or up to 5 minutes over Europe by Meteosat 9, it is additionally easy to carry out a temporal and spatial synchronization of the two data streams.

The concept is thus also suitable for measurements at high temporal repetition rates, using multiple (small) satellites in a suitable configuration. In this way, it is possible to create a time series of the measured variable within a territory which allows the change in the measured variable of a territory to be analyzed and/or visualized over the course of a certain time period, for example over the course of a day.

Previously determined heat maps of a territory are combined into a time series, wherein the recording points in time of two consecutive heat maps of the time series are in each case within an established time period. The time at which a heat map is recorded can be the point in time at which the first and second thermal images associated with this heat map are recorded or, in the case of a small temporal offset between the times at which the two thermal images are synchronously recorded by the two satellites, it can also be a mean point in time or a pair of the two points in time at which the thermal images are recorded. The established time period can vary depending on the application, but in many instances is within a few hours, less than an hour, or even in the range of approximately 10 minutes. In many instances, multiple consecutive images can thus only be recorded within the established time period by a geostationary satellite or by a plurality of satellites in a low Earth orbit.

The requirements with regard to the IR detector of satellite B are relatively low, so that the approach is suitable for use in small satellites or CubeSats, which are considerably less expensive than traditional satellite missions. In this way, it is possible to improve the existing available spatial resolution by several orders of magnitude, at a fraction of the costs of a traditional satellite mission. The maximum achievable spatial resolution is essentially only limited by the detector and the optical system of the satellite.

A laborious and complex absolute calibration of the detector on board of satellite B is dispensed with, without the accuracy of the resulting land surface temperature worsening in the process. The approach does not require any tracking or identification of objects in the image, and no ground measurements.

The considerable increase in the spatial resolution, without introducing error sources generated as a result of downsampling, makes a multitude of new or enhanced applications possible, for example during the localized prediction of traffic conditions (such as wet or icy roads), in environmental research (such as the movement of rock sediments on glaciers, wild fires), in agriculture (vegetation health by way of evapotranspiration), in medicine (such as the health risk of overheating), as well as, closely related thereto, during urban planning (such as the energy efficiency determination of structures or measurement of the urban microclimate).

The latter is a particularly interesting application for examining the effects of urban heat islands and corresponding counter-measures. An increase in the resolution from square kilometers to the size of a structure or a building block supplies important information with respect to energy efficiency, the temperature trend, as well as the influence of green spaces, green or reflective roofs, or open expanses of water on the urban climate. Until now, corresponding ascertainments are based on a patchwork of simulated models, together with isolated ground measurements, as well as data generated by one of the above-described downsampling methods. A high temporal and spatial resolution method may help with planning the cities of the future to be healthier and more environmentally friendly.

The invention claimed is:

1. A method for determining a heat map of a territory, the method comprising:
receiving a first thermal image of a first landscape including the territory, wherein the first thermal image is recorded by a recording device included on a first satellite, wherein the first thermal image comprises multiple pixels that are spatially associated with the territory, and wherein the recording device included on the first satellite, pixel by pixel, assigns and includes on the first thermal image, a respective first measured value to the territory;
receiving a second thermal image of a second landscape including the territory, wherein the second thermal image is recorded by a recording device included on a second satellite, wherein the second thermal image comprises multiple pixels that are spatially associated with the territory, and wherein the recording device included on the second satellite, pixel by pixel, in each case assigns and includes on the second thermal image, a second measured value to the territory,
wherein a temporal offset exists between a time at which the first thermal image is recorded and a time at which the second thermal image is recorded, wherein the temporal offset is below an established limit, wherein a radiometric precision of the first thermal image is higher than a radiometric precision of the second thermal image, and wherein a spatial resolution of the second thermal image is higher than a spatial resolution of the first thermal image;
determining, for a first pixel group of the second thermal image, the first pixel group being spatially associated with the territory, and the first pixel group comprising multiple pixels, a measured value offset of the first pixel group using a comparison of relative measured values of at least two pixels of the multiple pixels of the first pixel group of the second thermal image to the first measured value of the at least one pixel of the first thermal image which is at least partially spatially associated with the first pixel group of the second thermal image;
determining a corrected absolute measured value of the pixels of the first pixel group which are associated with the territory, wherein the corrected absolute measured value is based on a second measured value of the at least two pixels of the multiple pixels of the first pixel group and the measured value offset, and
creating a precise heat map of the territory based on the corrected absolute measured value of the pixels of the first pixel group which are associated with the territory.

2. The method according to claim 1, further comprising:
determining the measured value offset of the first pixel group of the second thermal image using a comparison of relative measured values of at least one pixel of the first pixel group of the second thermal image to the first measured value of the at least one pixel of the first thermal image which is spatially associated with the first pixel group of the second thermal image.

3. The method according to claim 1, further comprising:
determining a land surface temperature of the territory based on the precise heat map and at least one of a land surface model or an emission model.

4. The method according to claim 1, wherein at least one of the first thermal image or the second thermal image is an infrared image.

5. The method according to claim 1, wherein the spatial resolution of the second thermal image is at least one of: one order of magnitude higher or two orders of magnitude higher than the spatial resolution of the first thermal image.

6. The method according to claim 1, wherein the first measured value and the second measured value are temperature values, wherein a radiometric deviation of the first thermal image per pixel is less than 2 K, and wherein a radiometric deviation of the second thermal image is, on average, greater than 2 K.

7. The method according to claim 1, wherein the recording device included on the first satellite is calibrated so as to increase radiometric precision of the recording device included on the first satellite.

8. The method according to claim 1, wherein the first thermal image is recorded by the recording device included on at least one of a geostationary satellite in a high Earth orbit or a non-geostationary satellite in a low Earth orbit.

9. The method according to claim 1, wherein the second thermal image is recorded by the recording device included on a satellite smaller in size than the satellite on which the recording device that records the first thermal image is included.

10. The method according to claim 1, further comprising:
determining a first heat map of the territory at a first point in time using a first received thermal image and a second received thermal image;
determining a second heat map of the territory at a second point in time using a third received thermal image and a fourth received thermal image; and
creating a time series of a temperature of the territory based on the first and second heat maps.

11. The method according to claim 10, wherein the first and second points in time are within an established time period, wherein the first thermal image and third thermal image each have a higher radiometric precision than at least one of the second thermal image or the fourth thermal image, wherein the first thermal image and the third thermal image are each recorded by a recording device included on a first satellite platform, wherein the second thermal image has a higher spatial resolution than at least one of the first thermal image or the third thermal image and recorded by a recording device included on a second satellite, wherein the fourth thermal image has a higher spatial resolution than at least one of the first thermal image or the third thermal image and is recorded by a recording device included on a third satellite, and wherein the second satellite and the third satellite are each smaller than the first satellite platform.

12. The method according to claim 10, further comprising:
determining multiple additional heat maps of the territory at additional points in time, wherein two consecutive points in time of the additional points in time are in each case within an established time period; and
creating a time series of a temperature of the territory based on the first heat map, the second heat map, and the additional heat maps.

13. A device for creating a heat map of a territory, comprising:
at least one receiving unit configured to:
receive a first thermal image of a first landscape including the territory, recorded by a recording device included on a first satellite, wherein the first thermal image comprises multiple pixels that are spatially associated with the territory, and wherein the recording device included on the first satellite, pixel by pixel, assigns and includes on the first thermal image, a respective first measured value to the territory; and
receive a second thermal image of a second landscape including the territory, recorded by a recording device of a second satellite, wherein the second thermal image comprises multiple pixels that are spatially associated with the territory, and the recording device included on the second satellite, pixel by pixel, assigns and includes on the second thermal image, a second measured value to the territory, wherein a temporal offset exists between a time at which the first thermal image is recorded and a time at which the second thermal image is recorded, the temporal offset being below an established limit, wherein a radiometric precision of the first thermal image is higher than a radiometric precision of the second thermal image, and wherein and a spatial resolution of the second thermal image is higher than a spatial resolution of the first thermal image; and
a determination unit configured to:
determine, for a first pixel group of the second thermal image, the first pixel group being spatially associated with the territory, the first pixel group comprising multiple pixels, a measured value offset of the first pixel group using a comparison of relative measured values of at least two pixels of the multiple pixels of the first pixel group to the first measured value of the at least one pixel of the first thermal image, which is at least partially spatially associated with the first pixel group of the second thermal image;
determine corrected absolute measured values of the pixels of the first pixel group, based on a second measured value of the at least two pixels of the multiple pixels of the first pixel group and the measured value offset; and
create the heat map of the territory based on the corrected absolute measured values.

14. The device according to claim 13, wherein the determination unit is further configured to:
determine a land surface temperature of the territory based on the heat map and at least one of a land surface model or an emission model.

15. The device according to claim 13, wherein at least one of the first thermal image or the second thermal image is an infrared image.

16. The device according to claim 13, wherein the spatial resolution of the second thermal image is at least one of one order of magnitude higher or two orders of magnitude higher than the spatial resolution of the first thermal image.

17. The device according to claim 13, wherein the first measured value and the second measured value are temperature values.

18. The device according to claim 13, wherein the recording device included on the first satellite is calibrated to increase radiometric precision of the recording device included on the first satellite, wherein a radiometric deviation of the first thermal image per pixel is less than 2 K, and wherein a radiometric deviation of the second thermal image is, on average, greater than 2 K.

19. A device for creating a heat map of a territory, the device comprising:
at least one receiving unit configured to:
receive a first thermal image of a first landscape including the territory recorded by a recording device included on a first satellite, wherein the first thermal image comprises multiple pixels that are spatially associated with the territory and wherein the recording device included on the first satellite, pixel by pixel, assigns and includes on the first thermal image, a respective first measured value of the territory; and
receive a second thermal image of a second landscape including the territory, recorded by a recording device of a second satellite, wherein the second thermal image comprises multiple pixels that are spatially associated with the territory, and the recording device included on the second satellite, pixel by pixel, assigns and includes on the second thermal image, a second measured value to the territory, wherein a temporal offset exists between a time at which the first thermal image is recorded, the temporal offset being below an established limit, where a radiometric precision of the first thermal image is higher than a radiometric precision of the second thermal image, and wherein a spatial resolution of the second thermal image is higher than a spatial resolution of the first thermal image; and a determination unit configured to:

determine, for a first pixel group of the second thermal image, the first pixel group being spatially associated with the territory, the first pixel group comprising multiple pixels, a measured value offset of the first pixel group using a comparison of relative measured values of at least two pixels of the multiple pixels of the first pixel group to the first measured value of the at least one pixel of the first thermal image, which is at least partially spatially associated with the first pixel group of the second thermal image;

determine corrected absolute measured values of the pixels of the first pixel group, based on a second measured value of the at least two pixels of the multiple pixels of the first pixel group and the measured value offset;

create the heat map of the territory based on the corrected absolute measured values; and determine a land surface temperature of the territory based on the heat map and at least one of a land surface model or an emission model;

wherein at least one of the first thermal image or the second thermal image is an infrared image, and wherein the spatial resolution of the second thermal image is at least one of: one order of magnitude higher or two orders of magnitude higher than the spatial resolution of the first thermal image.

20. The device according to claim 19, wherein the recording device included on the first satellite is calibrated to increase radiometric precision of the recording device included on the first satellite, wherein a radiometric deviation of the first thermal image per pixel is less than 2 K, and wherein a radiometric deviation of the second thermal image is, on average, greater than 2 K.

* * * * *